(12) United States Patent
Ho

(10) Patent No.: US 6,499,378 B1
(45) Date of Patent: Dec. 31, 2002

(54) FOOTREST FOR A BICYCLE

(75) Inventor: Jong-Wei Ho, Ho-Mei Chen (TW)

(73) Assignee: Han Vin Ent. Co., Ltd. (TW)

( * ) Notice: Subject to any disclaimer, the term of this patent is extended or adjusted under 35 U.S.C. 154(b) by 0 days.

(21) Appl. No.: 09/753,632

(22) Filed: Jan. 2, 2001

(51) Int. Cl.[7] .................................................. G05G 1/18
(52) U.S. Cl. .......................................... 74/564; 280/291
(58) Field of Search ......................... 74/560, 563, 564; 280/291

(56) References Cited

U.S. PATENT DOCUMENTS

| | | | | |
|---|---|---|---|---|
| 625,368 A | * | 5/1899 | Thompson .................... | 74/564 |
| 5,482,307 A | * | 1/1996 | Lin .............................. | 280/291 |
| 5,524,918 A | * | 6/1996 | Peabody ...................... | 280/291 |
| 5,638,723 A | * | 6/1997 | Lin .............................. | 74/564 |
| 6,070,897 A | * | 6/2000 | Hsieh et al. ................. | 280/291 |
| 6,129,370 A | * | 10/2000 | Hsieh et al. ................. | 280/291 |
| 6,142,499 A | * | 11/2000 | Hsieh et al. ................. | 280/291 |
| 6,149,177 A | * | 11/2000 | Valdez ........................ | 280/291 |
| 6,161,859 A | * | 12/2000 | Cheng ......................... | 280/291 |
| 6,193,255 B1 | * | 2/2001 | Lo .............................. | 280/291 |
| 6,199,887 B1 | * | 3/2001 | Lee ............................. | 280/291 |

\* cited by examiner

*Primary Examiner*—Vinh T. Luong
(74) *Attorney, Agent, or Firm*—Dellett & Walters

(57) ABSTRACT

A footrest for a bicycle includes a tube having a closed end and an open end, and a sheath removably mounted around the tube and engaged with a rim of the closed end. The closed end has a through-hole defined therein for allowing a wheel axle of the bicycle to extend therethrough. The sheath has a knurled outer periphery and is not rotatable with respect to the tube. A cap is detachably attached to the tube at the open end for retaining the sheath around the tube between the rim of the closed end and the cap. Furthermore, a fastening is adapted to be threadedly connected with the wheel axle to fasten the tube to the bicycle.

17 Claims, 5 Drawing Sheets

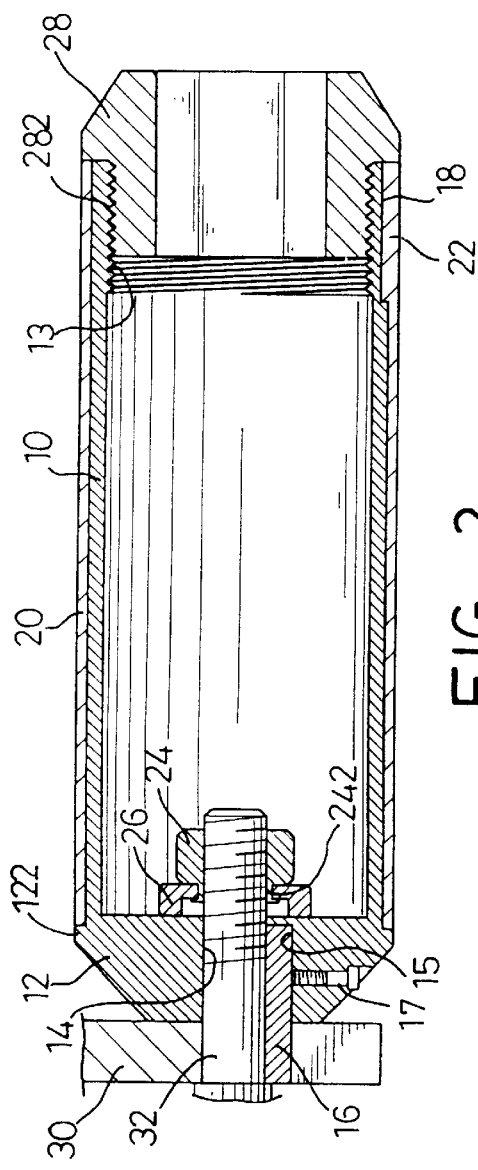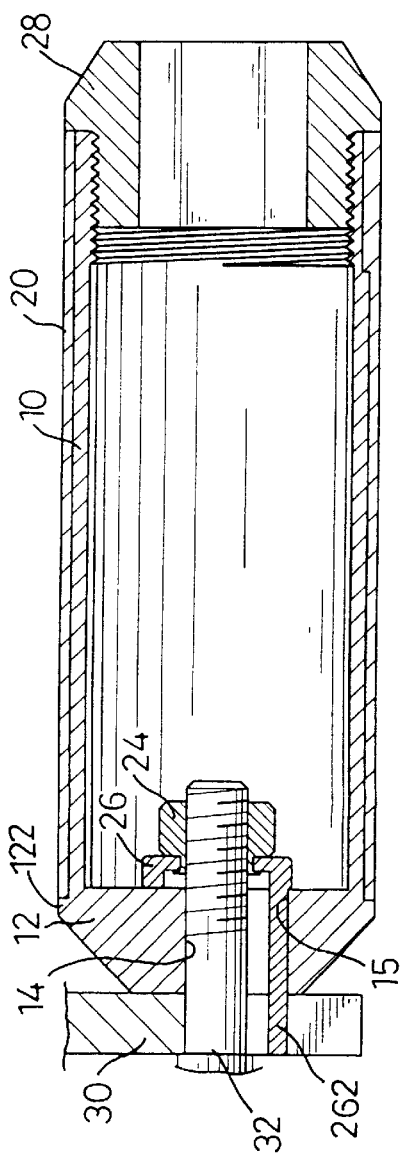

FOOTREST FOR A BICYCLE

BACKGROUND OF THE INVENTION

1. Field of the Invention

The present invention relates to a footrest for a bicycle and, more particularly, to such a footrest which has prolonged service life.

2. Description of Related Art

It can be found that some bicycles are provided with footrests for users to put their feet thereon, especially for acrobats to stand thereon during a show. As shown in FIG. 6, a footrest of a conventional type generally includes a tube. (50) having a closed end and an open end, with the closed end defining a through-hole for allowing a wheel axle (32) at a fork (30) of a bicycle to extend therethrough. The tube (50) is fastened to the bicycle, by means of a nut (52) that tightly engages the wheel axle (32) and hence presses the closed end of the tube (50) against the fork (30), through a washer (54).

The tube (50) is typically formed with a knurled outer periphery, in order to provide the user with enough friction to avoid the sliding of his/her foot over it. However, the knurled outer periphery will be worn out quickly, because the tube (50) is commonly made of aluminum, rather than a wear-resistant material.

As shown in FIG. 7, another footrest for such use includes a tube (60) covered with a sheath (62) of steel. Because the sheath (62) is so tightly fitted around the tube (60), this footrest would be discarded as a whole when a knurled outer periphery of the sheath (62) is eventually worn out, which is wasteful in terms of money and resources.

In addition, the two footrests share a common problem in that the way they are connected to the bicycles might bring the user into particular risk of slipping and falling. This is because the nuts might be loosened accidentally and hence the tube (50, 60) might be rotatable with respect to the bicycle.

Therefore, it is an objective of the invention to provide a footrest for a bicycle to mitigate and/or obviate the aforementioned problems.

SUMMARY OF THE INVENTION

The object of the present invention is to provide a footrest for a bicycle which has a prolonged service life.

Another object of the present invention is to provide a footrest for a bicycle which brings no risk of slipping to a user thereon.

Other objects, advantages and novel features of the invention will become more apparent from the following detailed description when taken in conjunction with the accompanying drawings.

BRIEF DESCRIPTION OF THE DRAWINGS

FIG. 2 is a cross sectional side plane view showing the footrest of FIG. 1 in assembly;

FIG. 3 is a cross sectional side plane view of a sub embodiment of the footrest shown in FIGS. 1 and 2;

DETAILED DESCRIPTION OF THE PREFERRED EMBODIMENT

Figure 1:
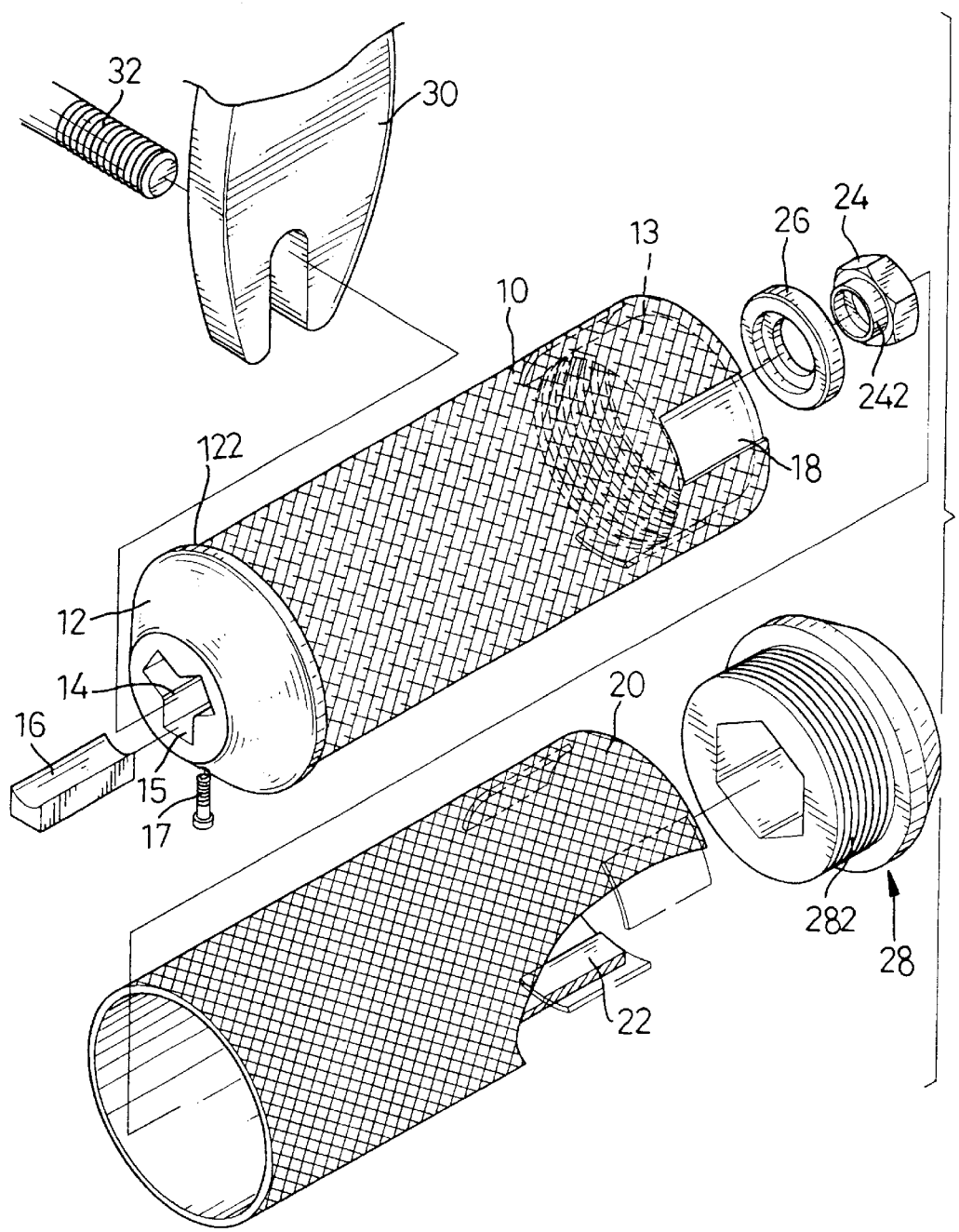
FIG. 1 is an exploded perspective view of a preferred embodiment of a footrest for a bicycle in accordance with the present invention.

Referring to FIGS. 1 and 2, there is shown a preferred embodiment of a footrest in accordance with the present invention used for a bicycle, preferably held on a wheel axle (32) at a bottom end of a fork (30).

The footrest includes a tube (10) and a sheath (20), each being formed with a knurled outer periphery. The tube (10) has a closed end (12) and an open end (numbered), with a rim (122) of the closed end (12) projecting from the outer periphery of the tube (10). The closed end (12) defines a through hole (14) for allowing the wheel axle (32) to extend therethrough, and a plurality of key slots (15) around the through hole (14) for receiving a key (16) in one of them. A set screw (17) is provided for tightly engaging the key (16), as best shown in FIG. 2.

The sheath (20) is removably mounted around the tube (10), engaging a rim (122) of the closed end (12), in such a way that it is not rotatable with respect to the tube (10). To this end, the tube (10) may be formed with a plurality of, and preferably three, equi-spaced recesses (18) defined in an outer periphery thereof at the open end, whereas the sheath (20) has a plurality of protrusions (22) adapted to be received in the recesses (18), so as to prevent the sheath (20) from rotating with respect to the tube (10).

The sheath (20) is retained on the tube (10) between the rim (122) of the closed end (12) and a cap (28) that is detachably attached to the tube (10) at the open end. In this preferred embodiment, the cap (28) has a threaded portion (282) configured to mate with a threaded periphery (13) formed at the open end of the tube (10), which detachably or threadedly attaches the cap (28) to the open end of the tube (10).

Furthermore, there is provided a fastening used to fasten the tube (10) to the bicycle. As illustrated in FIGS. 1 and 2, the fastening may be configured as a nut (24) adapted to be threadedly connected with the wheel axle (32). Preferably, the nut (24) is joined with a coaxial washer (26) which is to be mounted around the wheel axle (32) between the nut (24) and the closed end (12) of the tube (10). More preferably, the coaxial washer (26) is rotatably coupled to the nut (24), such as by means of a tube (242) that extends from the nut (24) into the washer (26). Additionally, the tube (242) has a distal deformable end which is deformed once the washer (26) is mounted on the tube, thereby rotatably coupling the coaxial washer (26) to the nut (24).

Referring to FIG. 2, the footrest is assembled by mounting the sheath (20) around the tube (10), with the protrusions (22) of the sheath (20) received in the recesses (18) of the tube (10). After the wheel axle (32) has been extended through the through-hole (14) in the closed end (12) of the tube (10), the nut (24) is threadingly connected to the axle (32) and moves the washer (26) forwards until the closed end (12) of the tube (10) is tightly engaged with the fork (30). The cap (28) is then attached to the open end of the tube (10), retaining the sheath (20) thereon.

In the meantime, one of the slots (15) around the through-hole (14) is aligned with a notch of the fork (30) in which the wheel axle (32) is held. The key (15) is inserted in both the key slot (15) and the notch and then retained therein by the set screw (17), so as to prevent the tube (10) and hence the whole footrest from rotation with respect to the bicycle.

Instead of the separate key (16), the washer (26) may be formed with an integral key (262) that extends into both the key slot (15) and the notch, as shown in FIG. 3. The key (262) is retained therein when the nut (24) is tightly connected with the wheel axle (32). This configuration of the key (262) achieves the same purpose as the separate key does.

Referring to FIGS. 1 to 3, the knurled outer periphery of the sheath (20) is used to provide a user with enough friction to avoid the sliding of his/her foot over it. There is no risk of any possible slipping for him/her, on account of the non-rotatable arrangement of the tube (10) and the sheath (20), resulted from the key (16 or 262) as well as from the engaged recesses (18) and protrusions (22).

In addition, the useful life of the sheath (20) can be extended when its knurled outer periphery is worn out at the top, on which the user generally rests his/her foot. In the embodiment here, the extension is achieved by removing the cap (28) from the tube (10) and repositioning the sheath (20) in a manner of turning it by a certain degree. With the cap (28) reattached, the useful life of the sheath (20) is extended, i.e. given a knurled outer periphery that is intact at the top.

Even if the sheath (20) is worn out throughout its outer periphery, it may be removed from the tube (10), leaving the latter (10) on the bicycle alone. Now, the tube (10) alone is in service with the knurled outer periphery of itself. The extension of useful life can be the same for the tube (10) as the sheath (20), by repositioning the tube (10) after loosening the nut (24) and removing the key (16 or 262) from the key slot (15). Once the key (15) is extended through another key slot (15) and the nut (24) is tightened again, the useful life of the tube (10) will be extended as it is provided with a knurled outer periphery that is intact at the top.

These operations prolong the service life of the tube (10) and the sheath (20) or of the footrest. Optionally, the tube (10) and the sheath (20) may be made of different materials, such as steel for one and aluminum for the other, and may be made in different colors, so as to give double varieties in both nature and color to the inventive footrest.

Figure 4:
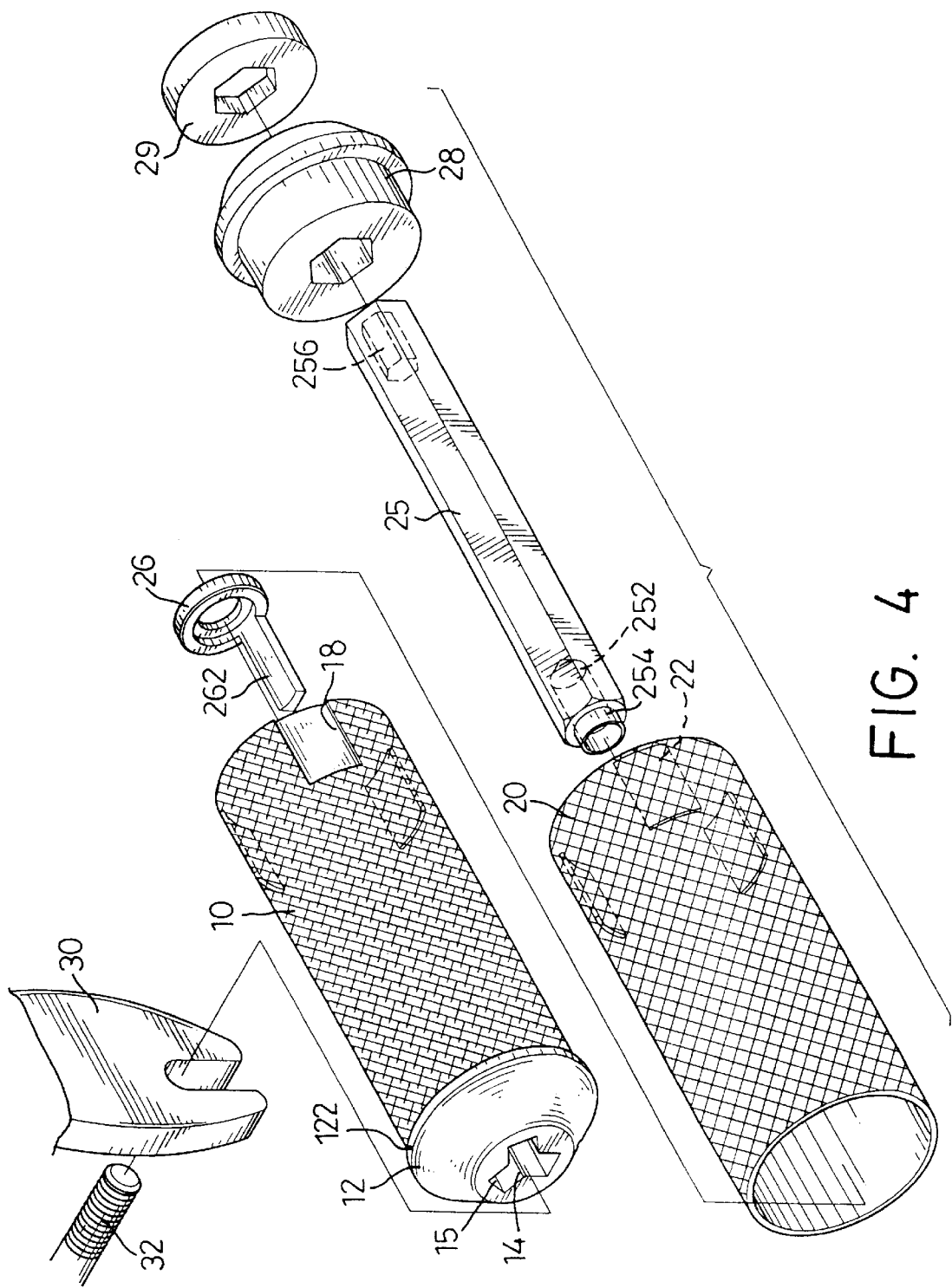
FIG. 4 is an exploded perspective view of an alternative preferred embodiment of a footrest in accordance with the present invention.
Figure 5:
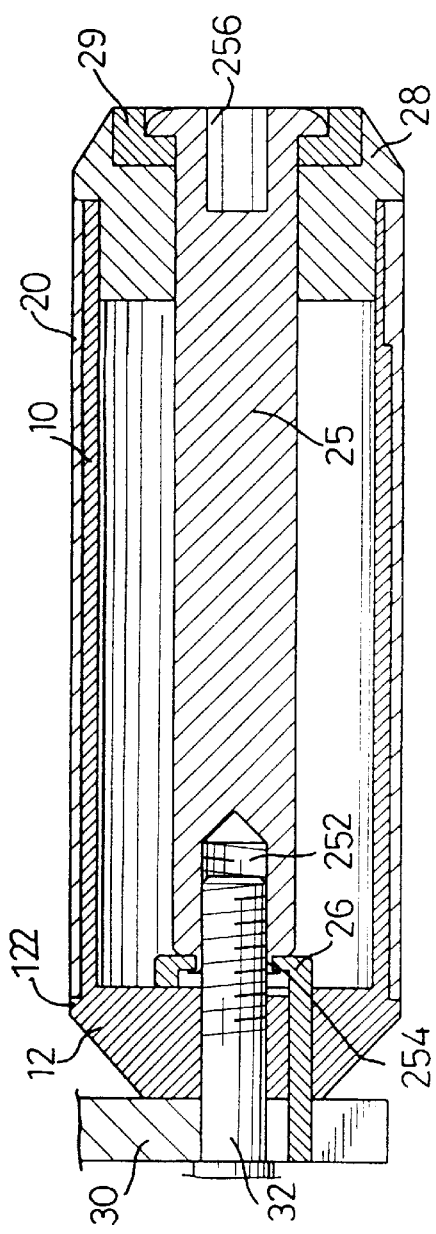
FIG. 5 is a cross sectional side plane view showing the footrest of FIG. 4 in assembly.
Figure 6:
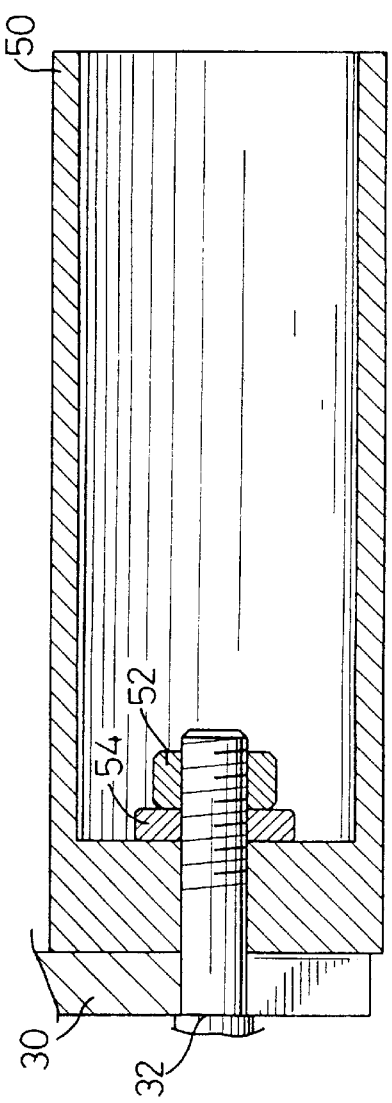
FIG. 6 is a cross sectional side plane view of a conventional footrest.
Figure 7:
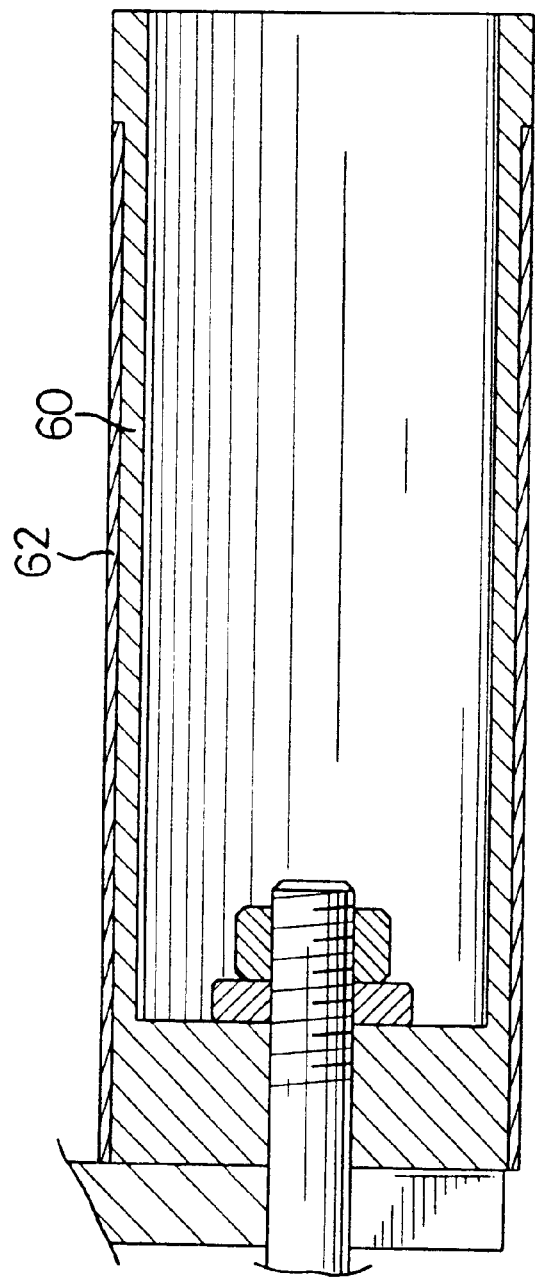
FIG. 7 is a cross sectional side plane view of another conventional footrest.

Referring to FIGS. 4 and 5, the fastening may alternatively be configured as an extension rod (25) that has a first end defining a threaded hole (252) and a second end defining a polygonal hole (256), with the threaded hole (252) adapted to be threadedly connected with the wheel axle (32).

The extension rod (25) may be formed with the same coaxial washer (26) as the one illustrated in FIG. 3, which is now to be mounted around the wheel axle (32) between the extension rod (25) and the closed end (12) of the tube (10). The coaxial washer (26) is rotatably coupled to the extension rod (25), by means of a tube (254) that extends from the first end of the extension rod (25) into the coaxial washer (26). The washer (26) is retained on the tube (254) in the same manner as mentioned with reference to FIG. 3.

As shown in FIG. 5, the second end of the extension rod (25) extends through the hollow cap (28) and a coaxial ring (29) which is situated on an outer side of the cap (28). The second end of the extension rod (25) is then enlarged in such a way, such as by forging and the like, such that the cap (28) and the ring (29) may be retained thereon.

Having been threaded on to the wheel axle (32), the extension rod (25) may be driven by a tool, especially a socket screw wrench (not shown) engaged in the polygonal hole (256). The rod (25) is turned until it is tightly connected with the axle (32), when the cap (28) will be pressed against the tube (10) and the sheath (20) by the enlarged end of the rod (25). This simplifies the attachment of the cap (28) to the open end of the tube (10).

In this embodiment, the useful life of the sheath (20) can also be extended when its knurled outer periphery is worn out at the top. However, the extension is now obtained by driving the rod (25) so that the cap (28) is released from the sheath (20). The useful life of the sheath (20) is renewed as soon as it is repositioned and the rod (25) is tightened again.

From the above description, it is noted that the invention has the following advantages:

1. prolonged service life:

Because the sheath (20) is removably mounted around the tube (10), either of the two can be put into service, which prolongs the service life of the footrest.

2. no risk of slipping for the user:

Because the tube (10) and the sheath (20) are not rotatable relative to the fork (30), there is no risk of any possible slipping for the user standing thereon.

It is to be understood, however, that even though numerous characteristics and advantages of the present invention have been set forth in the foregoing description, together with details of the structure and function of the invention, the disclosure is illustrative only, and changes may be made in detail, especially in matters of shape, size, and arrangement of parts within the principles of the invention to the full extent indicated by the broad general meaning of the terms in which the appended claims are expressed.

What is claimed is:

1. A footrest for a bicycle, the footrest comprising:
   a tube (10) having a closed end (12) and an open end, said closed end (12) having a rim (122) projecting from an outer periphery of said tube (10) and a through hole (14) defined through the rim for allowing a securing member (32) of said bicycle to extend through the through hole (14);
   a sheath (20) movably mounted around said tube (10) and engaged with said rim (122) of said closed end (12), said sheath (20) having a knurled outer periphery and being stationary with respective to said tube (10);
   a cap (28) detachably attached to said tube (10) at said open end for retaining said sheath (20) around said tube (10); and
   a fastening adapted to be threadingly connected with said securing member (32) to fasten said tube (10) to said bicycle, wherein said tube (10) has a plurality of recesses (18) defined in an outer periphery thereof at said open end, and
   wherein said sheath (20) has a plurality of protrusions (22) adapted to be received in said recesses (18) of said tube (10), thereby preventing said sheath (20) from rotating relative to said tube (10).

2. The footrest for the bicycle as claimed in claim 1, wherein said tube (10) has a knurled outer periphery.

3. The footrest for the bicycle as claimed in claim 1, wherein said closed end (12) of said tube (10) includes a plurality of key slots (15) defined around a periphery defining said through-hole (14) and a key (16) received in one of said key slots (15).

4. The footrest for the bicycle as claimed in claim 3, wherein said closed end (12) is provided with a set screw (17) to tightly engage said key (16).

5. The footrest for the bicycle as claimed in claim 1, wherein said recesses (18) are equi-spaced around said outer periphery of said tube (10).

6. The footrest for the bicycle as claimed in claim 5, wherein said recesses (18) are three in number.

7. The footrest for the bicycle as claimed in claim 1, wherein said fastening is configured as a nut (24) adapted to be threadedly connected with said securing member (32).

8. The footrest for the bicycle as claimed in claim 7, wherein said nut (24) is formed with a coaxial washer (26) rotatably coupled thereto, and wherein said washer (26) is adapted to be mounted around said securing member (32) between said nut (24) and said closed end (12) of said tube (10).

9. The footrest for the bicycle as claimed in claim 8, wherein said nut (24) has a tube (242) extending through said coaxial washer (26), and wherein said tube (242) has a distal deformable end to retain said coaxial washer (26) thereon, thereby rotatably coupling said coaxial washer (26) to said nut (24) when said distal deformable end is deformed.

10. The footrest for the bicycle as claimed in claim 8, wherein said closed end (12) of said tube (10) defines a plurality of key slots (15) around said through-hole (14), and wherein said coaxial washer (26) is formed with a key (262) extending into one of said key slots (15).

11. The footrest for the bicycle as claimed in claim 7, wherein said tube (10) has an inner threaded periphery (13) at said open end, and wherein said cap (28) has a threaded portion (282) configured to mate with said threaded inner periphery (13) of said tube (10).

12. The footrest for the bicycle as claimed in claim 1, wherein said fastening is configured as an extension rod (25) having a first end and a second end, and wherein said first end of said extension rod (25) defines a threaded hole (252) adapted to be threaded connected with said screw-like member (32) and said second end of said extension rod (25) adapted to be connected with said cap (28).

13. The footrest for the bicycle as claimed in claim 12, wherein said extension rod (25) is formed with a coaxial washer (26) rotatably coupled to said first end thereof, and wherein said washer (26) is intended to be mounted around said screw-like member (32) between said extension rod (25) and said closed end (12) of said tube (10).

14. The footrest for the bicycle as claimed in claim 13, wherein said extension rod (25) is formed at said first end with a tube (254) extending through said coaxial washer (26), and wherein said tube (254) has a distal deformable end to retain said coaxial washer (26) thereon, thereby rotatably coupling said coaxial washer (26) to said extension rod (25) when said distal deformable end is deformed.

15. The footrest for the bicycle as claimed in claim 13, wherein said closed end (12) of said tube (10) defines a plurality of key slots (15) around said through-hole (14), and wherein said coaxial washer (26) is formed with a key (262) extending into one of said key slots (15).

16. The footrest for the bicycle as claimed in claim 12, wherein said second end of said extension rod (25) defines a polygonal hole (256) therein.

17. The footrest for the bicycle as claimed in claim 16, wherein said cap (28) further includes a coaxial ring (29) situated on an outer side thereof, and wherein said second end of said extension rod (25) extends through said cap (28) and said coaxial ring (29) and is enlarged in such a way that said cap (28) and said ring (29) may be retained on said extension rod (25).

* * * * *